United States Patent
Eaton

(10) Patent No.: US 6,382,332 B1
(45) Date of Patent: May 7, 2002

(54) DRILL BIT APPARATUS FOR RECEIVING SEISMIC SOUND SIGNALS

(75) Inventor: Michael Robert Eaton, Queen Camel (GB)

(73) Assignee: Thomson Marconi Sonar Limited, Middlesex (GB)

( * ) Notice: Subject to any disclaimer, the term of this patent is extended or adjusted under 35 U.S.C. 154(b) by 0 days.

(21) Appl. No.: 09/447,340

(22) Filed: Nov. 22, 1999

(30) Foreign Application Priority Data

Nov. 20, 1998 (GB) .............................. 9825434

(51) Int. Cl.$^7$ .............................. E21B 47/00; G01V 1/40
(52) U.S. Cl. ............................................ 175/50; 367/57
(58) Field of Search ....................... 175/41, 50; 367/57, 367/86

(56) References Cited

U.S. PATENT DOCUMENTS

| | | | | |
|---|---|---|---|---|
| 3,876,016 A | * | 4/1975 | Stinson ........................ | 175/45 |
| 4,873,675 A | * | 10/1989 | Barr, Jr. et al. ................ | 367/57 |
| 4,965,774 A | * | 10/1990 | Ng et al. ....................... | 367/75 |
| 5,111,437 A | | 5/1992 | Rice .............................. | 367/57 |
| 5,148,407 A | * | 9/1992 | Haldorsen et al. ............ | 367/32 |
| 5,372,207 A | * | 12/1994 | Naville et al. ................. | 175/1 |
| 5,511,038 A | * | 4/1996 | Angeleri et al. .............. | 367/40 |
| 5,555,220 A | | 9/1996 | Minto .......................... | 367/86 |
| 5,774,418 A | * | 6/1998 | Magendie et al. ............ | 367/25 |
| 5,798,488 A | * | 8/1998 | Beresford et al. ........... | 181/102 |
| 5,901,113 A | * | 5/1999 | Masak et al. ................. | 367/57 |

FOREIGN PATENT DOCUMENTS

| | | |
|---|---|---|
| EP | 0 780 702 A1 | 6/1997 |
| GB | 2 288 020 | 10/1995 |

OTHER PUBLICATIONS

Richard Meehan et al. "Seismic Information Helps Predict Drilling Hazards, Choose Casting Point" Oil and Gas Journal, US, Pennwell Publishing Co. Tulsa, vol. 96, No. 19, May 11, 1998, pp. 53–54, 56–58, 60, XPO0O768732.

* cited by examiner

Primary Examiner—Hoang Dang
(74) Attorney, Agent, or Firm—Crowell & Moring LLP

(57) ABSTRACT

A drilling rig 10 supports a drill string 11 within a borehole 12. An acoustic receiver 14 is associated with a drill bit 13 connected to the end of the drill string 11. An acoustic source 16, such as an airgun, is located at the earth's surface 17 some distance from the rig 10. In operation, the acoustic source 16 is controlled to transmit an acoustic pulse downwards into the rock formations surrounding the borehole 12. The acoustic energy travelling on a path 18 reaches the rock in contact with the drill bit 13 which is thereby detected by the acoustic receiver 14. Boundaries 20 and 23 in the rock formations are detected and their positions determined by receiving signals from the source 16 after reflection by the boundaries 20 and 23. Time-depth check-shots may be obtained by timing acoustic propagation along either path 18 or path 27. A Vertical Seismic Profile can be obtained by performing measurements with the drill bit 13 at different depths in the borehole.

8 Claims, 4 Drawing Sheets

DRILL BIT APPARATUS FOR RECEIVING SEISMIC SOUND SIGNALS

BACKGROUND OF THE INVENTION

This invention relates to drilling apparatus and in particular to drilling apparatus for determining information about rock formations about a borehole.

When drilling, and particularly when drilling for oil, the design of the well-bore trajectory will largely be based on the interpretation of data acquired by a surface seismic survey. One drawback with data obtained by such a survey is that the depth of sub-surface features such as rock boundaries are not defined in terms of distances but in terms of the time it takes an acoustic signal to travel to the feature from the surface and back again. In order to aid the interpretation of the seismic data it is therefore desirable to relate these acoustic travel times to actual depths thus establishing a 'time-depth tie'.

Conventionally this is performed by removing the drill string from the well-bore and deploying an acoustic receiver into the well on a wireline. A source on the surface is used to transmit acoustic energy into the earth, and the acoustic signal is detected by the down-hole receiver. By knowing the depth of the receiver and by measuring the time it takes the acoustic signal to travel from the surface to the receiver, the time-depth relationship can be established for this particular depth. This process is repeated with the receiver located at several different depths. Such a method is referred to as a 'check-shot' survey. Removal of the drill string from a well-bore is time consuming and expensive.

It is an object of the present invention to provide apparatus by which the time-depth tie 'check-shot' measurement may be made without the need to remove the drilling apparatus from the borehole.

Also of interest whilst drilling is information about the rock strata that will be drilled through at any time, in order to allow appropriate drilling parameters and strategies to be employed. One particular concern is the presence of over-pressure regions in the strata ahead of the drill which have the potential for blowing into the well when penetrated, potentially creating a hazardous situation. This situation may be alleviated by appropriately altering the weight or pressure of the drilling mud which is present in the well-bore. Another concern is the setting of casing in the correct place in the well-bore, which may have implications regarding the ability of the well to produce oil. A still further concern is in the drilling along a reservoir formation, which may be at or near to horizontal, without breaking through into the formations above or below the reservoir. All of these concerns require knowledge of the rock formations about the drill bit and thus the borehole.

Patent Application GB 2288020 discloses drilling apparatus in which an acoustic source and receiver arrangement is mechanically connected to a drill bit at the end of a drill string in a borehole. Acoustic signals are transmitted by way of the drill bit into the rock formations ahead of the bit, with reflected signals being received again through the drill bit. In order to achieve the required resolution, the acoustic signals used in this apparatus will be above the frequency range of conventional surface seismic exploration apparatus. However, the use of these higher frequencies limits the range of this apparatus and makes a direct comparison with surface seismic data, to establish a tie between the position of the drill bit and the surveyed formations, difficult.

OBJECT OF THE INVENTION

The object of the invention is to provide improved drilling method and apparatus.

SUMMARY OF THE INVENTION

In accordance with a first aspect of the present invention, there is provided drilling apparatus for determining information about the rock formations about a borehole, comprising:
- a drill bit connected at the end of a drill string in the borehole and in contact with rock at the end of the borehole;
- an acoustic source located at or near the earth's surface; and
- an acoustic receiver in a rigid mechanical connection with the drill bit such that acoustic signals transmitted by the acoustic source and propagated through the formations are received by the acoustic receiver via the drill bit; wherein
- the acoustic receiver is a piezo-ceramic transducer having one face in rigid connection with the drill bit; and
- a face of said acoustic receiver opposite the drill bit is connected to a tail mass.

Travel time-to-depth relationships may be determined by measurement of the propagation time of acoustic signals from the source to the receiver. In this case, the information about the rock formations is the characteristics of acoustic propagation through them. Alternatively or in addition, the existence and positions of boundaries between different rock types, other materials or other such parameter may be determined. The present invention allows information about the rock formations to be obtained without requiring the removal of the drill string and bit.

In accordance with a second aspect of the present invention, there is provided a method of obtaining information about the rock formations about a borehole, comprising:
(a) drilling the borehole with a drill bit connected to the end of a drill string;
(b) transmitting an acoustic signal from at or near the earth's surface;
(c) receiving the acoustic signal with an acoustic receiver in a rigid mechanical connection with the drill bit, the acoustic signal travelling through the rock formations and the drill bit to the acoustic receiver; and
(d) recording measurement data obtained by the acoustic receiver.

Preferably this method further comprises: repeating steps (a) to (d) such that measurement data is recorded in respect of a different position of the drill bit.

This aspect of the invention may allow check shot information and/or information equivalent to a Vertical Seismic Profile to be obtained without requiring the drill string and bit to be removed from the borehole.

BRIEF DESCRIPTION OF THE DRAWINGS

An embodiment of the present invention will now be described by way of example only with reference to the accompanying drawings, of which.

DETAILED DESCRIPTION OF THE DRAWINGS

Figure 1:
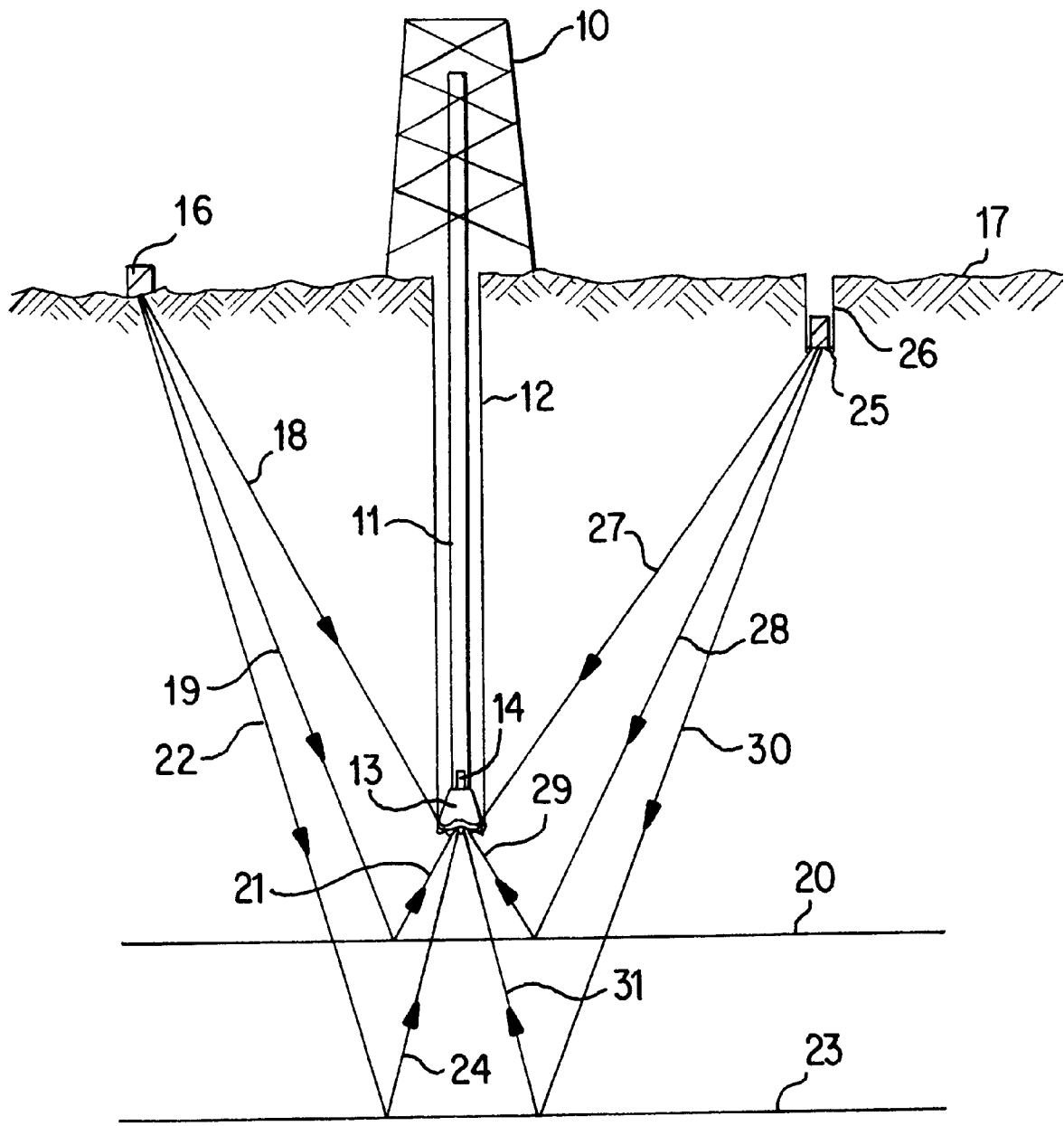
FIG. 1 shows drilling apparatus in accordance with the present invention installed in association with an inland borehole.

In FIG. 1, a drilling rig 10 supports a drill string and drill collars 11 within a borehole 12. A drill bit 13 is in a rigid mechanical connection with an acoustic receiver 14, the drill bit 13 and the acoustic receiver 14 being connected to the end of the drill string 11. The drill bit 13, drill string 11 and the acoustic receiver 14 is described in detail below.

Figure 2A:
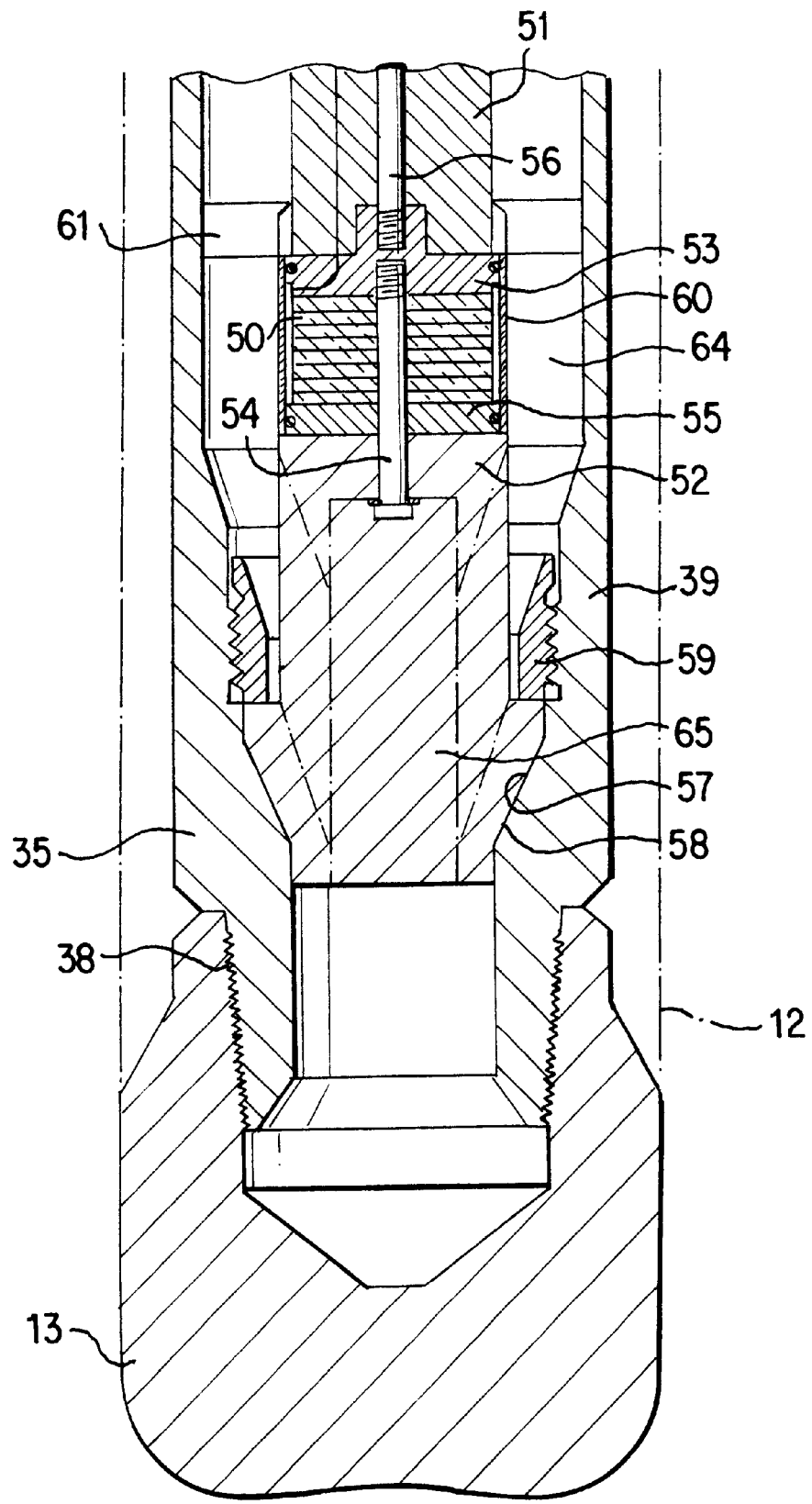
FIGS. 2A to 2C show parts at the FIG. 1 drilling apparatus in detail.
Figure 2B:
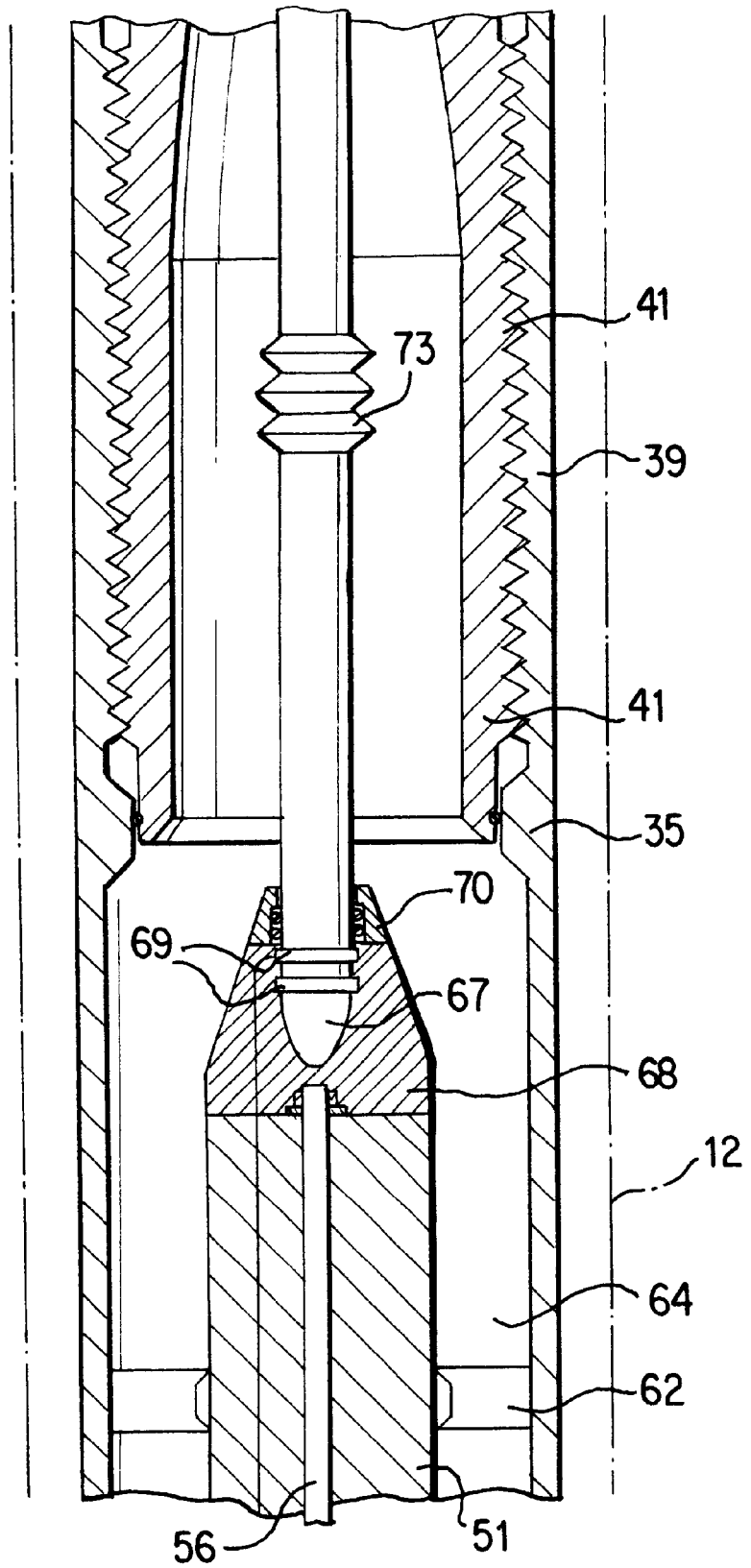
Figure 2C:
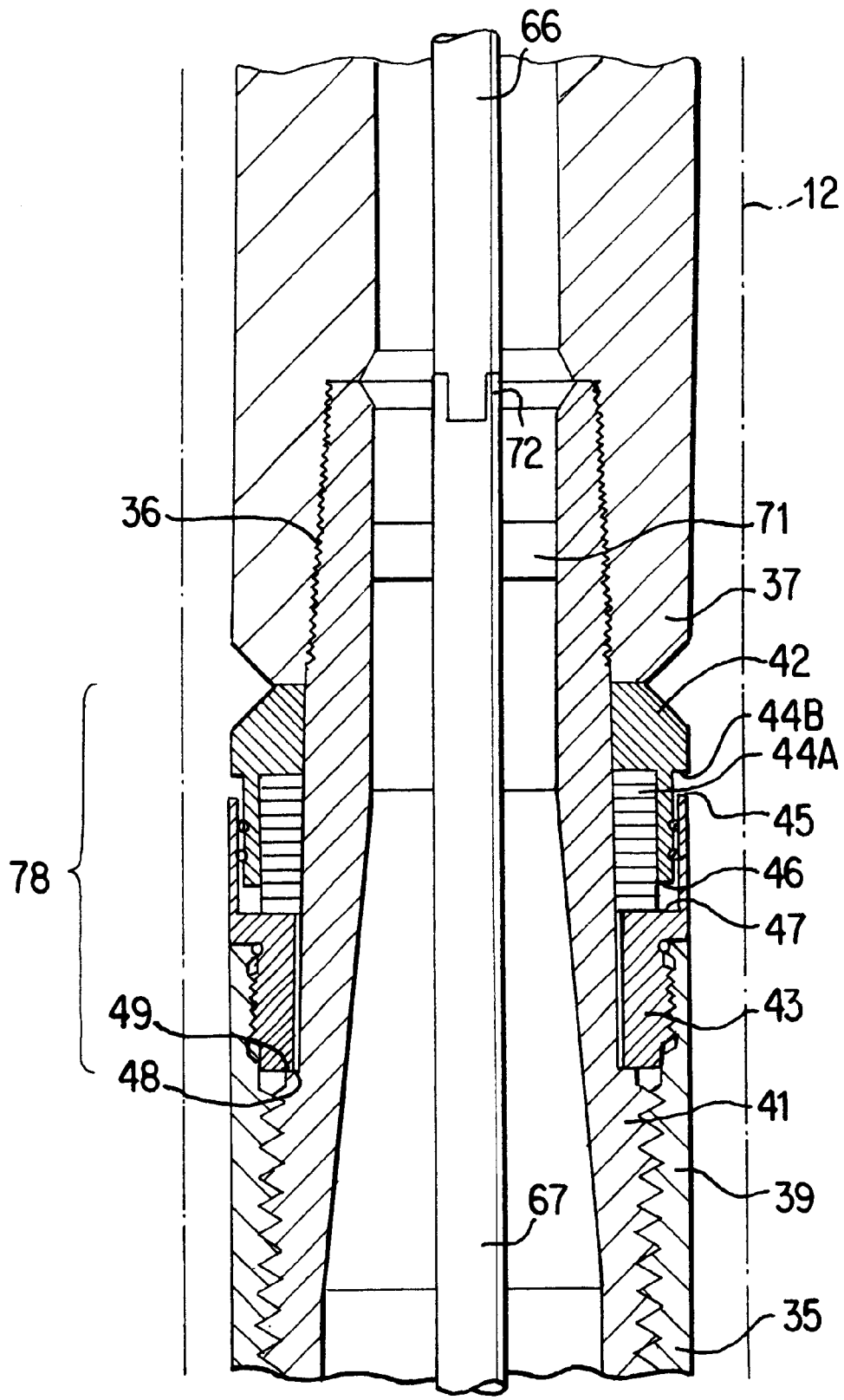

Referring to FIGS. 2A to 2C, arrangement at the acoustic receiver 14 in the borehole 12 is shown in detail. The FIGS. 2A to 2C are cross sections through the drill arranged from the bottom of the drill upwards.

At the lower end of the drill string and collars 11 is a measurement whilst drilling (MWD) drill collar 37. The MWD drill collar 37 comprises a plurality of drill pipe sections at the lower end of the drill string and collars 11 as is conventional, at the bottom of the MWD drill collar 37 is the drill bit 13 attached to the MWD drill collar 37 and drill string 11 by a modified drill collar section forming a MVD tool 35. In order to allow acoustic sensing, the acoustic receiver 14 is mounted in close proximity to the drill bit 13 at the base of the MWD tool 35.

During drilling, the acoustic receiver 14 does not operate and the drill bit 13 is rotated while being urged against the end of the borehole 12 with a weight on bit (WOB) provided by the weight of the drill string and collars 11. This WOB is controlled by the driller as normal. Because of the very high acoustic noise levels generated by the drilling operation in the rock strata and along the drill string 11 it is preferred not to attempt to use the acoustic receiver 14 while actual drilling is in progress. When acoustic measurements are to be made, drilling is paused and the part of MWD tool 35 which contains the acoustic receiver 14 and drill bit 13 is separated acoustically from the remainder of the MWD drill collar 37 and drill string 11 by a compliant section 78 of the MWD tool 35 while the drill bit 13 is loaded against the end of the borehole 12 with a specified WOB. This specified WOB will generally be less than the maximum allowable WOB used for actual drilling.

The compliant section 78 of the MWD tool 35 which allows the WOB to be varied as required for acoustic sensing acts as an acoustic isolator between the acoustic receiver 14 and the MWD drill collar 37 and the drill string 11. To achieve this, the compliance of the compliant section 78 is arranged to be such that the resonant frequency caused by the mass suspended from the compliant section and the compliance of the compliant section is substantially lower than the passband frequency of the acoustic receiver 14 in contact with expected rock types.

The MWD tool 35 is attached by a first conventional conical screw threaded joint 36 at its upper end to the bottom of the MWD drill collar 37 and is attached by a second conventional screw threaded joint 38 at its lower end to the drill bit 13. The MWD tool 35 comprises an outer hollow cylindrical member 39 mounting the drill bit 13 at its lower end by the conventional conical threaded joint 38 and substantially surrounding an inner hollow cylindrical member 41 which is attached to the lower end of the MWD drill collar 37 by the conventional conical screw threaded joint 36.

The outer and inner hollow cylindrical member 39 and 41 have co-operating longitudinal splines on their inner and outer surfaces respectively allowing them to slide axially relative to one another but still allowing large rotational loads to be transmitted along the MWD drill collar 37 through the two members 39 and 41 to the drill bit 13 during drilling. The inner hollow cylindrical member 41 is approximately one half of the length of the outer hollow cylindrical member 39.

Relative axial sliding movement of the inner and outer cylindrical members 39 and 41 is limited by a pair of stop rings 42 and 43. A compression stop ring 42 is attached to the inner member 41 to set the minimum length of the overall MWD tool 35 assembly and an extension stop ring 43 attached to the outer member 39 to limit the maximum length of the overall MWD drill tool 35 assembly. An annular compliant member 44 is mounted between the two stop rings 42 and 43.

During drilling the weight on bit (WOB) bears on the MWD tool 35, compressing the compliant member 44A and at the upper limits of WOB this compression is such that the compression and extension stop rings 42 and 43 come into contact at co-operating snubbing surfaces 44B and 45 and 46 and 47. Once the snubbing surfaces 44B and 46 of the compression stop ring 42 are in contact with their respective co-operating snubbing surfaces 45 and 47 of the extension stop ring 43, the maximum drilling load is transmitted between them between the inner and outer member 39 and 41 to the drill bit 13. This snubbing action may either be hard or soft with another suitable compliant interface (not shown) being used if necessary.

When it is desired to make measurements, the WOB is adjusted by the driller in the usual manner so that the compression and extension stop rings 42 and 43 separate. The WOB of the drill bit 13 is then set by a force generated by the compliant member 44A onto the various elements attached to the drill bit 13 plus the weight of those elements. In order to allow the drill bit 13 and MWD tool 35 to be extracted from the borehole 12, the extension stop ring 43 also has a third snubbing surface 48 which contacts a co-operating snubbing surface 49 on the inner cylindrical member 41 to limit extension of MWD tool 35. When extracting the MWD tool 35 and drill bit 13, tensional loads are passed through the snubbing surfaces 48 and 49 to allow the drill string 1 1 to pull out the MWD tool 35 and attached drill bit 13.

The acoustic receiver 14 is rigidly attached to the outer member 39 of the MWD tool 35. The acoustic receiver 14 comprises a stack of piezoelectric ceramic, commonly termed piezo-ceramic, disks 50, which form the electro-acoustically active part of the receiver 14, a tail mass 51, a stack base 52 and a central disc 53. The central disk 53, stack base 52 and stack 50 are all secured rigidly together by a first bolt 54 passing along their axis and into a threaded hole into the central disc 53, which is tightened to pre-compress the ceramic stack 50 between the disc 53 and a stack end cap 55 placed between the stack 50 and the base 52. The tension of the first bolt 54 is set to ensure that under all operating conditions the ceramic stack 50 is in compression. The tail mass 51 is secured rigidly to the central disc 53 by a second bolt 56 passing along the axis of the tail mass 51 and into a threaded hole in the central disc 53. The stack base 52 has a conical bearing surface 57 on its outer surface and acoustic receiver 14 is rigidly connected to the outer member 39 by this bearing surface 57 being urged against a corresponding conical bearing surface 58 on the inner surface of the outer member 39, the two mating bearing surfaces 57 and 58 being urged together by a threaded base ring 59 which co-operates with a threaded inner portion of the outer member 39. The ceramic stack 50 is surrounded by a cylindrical jacket 60 filled with a non-conductive fluid such as fluorinert. The jacket 60 and tail mass 51 are kept centred within the outer body 39 by a set of spiders 61 and 62 extending between the jacket 60 and the tail mass 51 and the inner surface of the outer member 39. The spiders 61 and 62 are soft in the axial direction to avoid being an acoustic short, stiff in the radial direction to stop shock loads causing the tail mass to break the ceramic assembly and have to transmit loads circumferentially to prevent angular accelerations from drill string windup causing the tail mass 51 to rotate relative to the stack base 52 because this would either loosen or over tighten the bolt 54.

During drilling, large quantities of drilling fluid (commonly known as drilling mud) are passed down the inside of the drill string 11 under high pressure into the drill bit 13. In order to allow this, the outer jacket 60 and tail mass 51 of the acoustic receiver 14 are arranged centrally within the hollow outer member 39 of the drill tool 35 leaving an annular mud passage 64 between them. In order to allow the mud to pass down this mud passage 64 to the drill bit 13 the spiders 61 and 62 are each formed by a plurality of radial vanes with mud gaps between them and the stack base 52 has mud passages 65 through it connecting the annular mud passage 64 to the drill bit 13. The spiders 61 and 62 are also formed by a plurality of vanes to constrain any relative rotational movement of the outer member 39 and the tail mass 51 and jacket 60 by the vanes transmitting loads circumferentially. Such rotational movement could otherwise occur during drilling due to the high torsional loads on the MWD tool 35 and as a consequence of drill string windup.

A connection to a power supply (not shown) housed in the drill collar 37 is provided along the axis of the drill collar 37 by an electrical cable carrier 66. The electrical cable carrier 66 is formed by a plurality of sections, each within one of the drill pipe sections forming the drill collar 37 and linked by threaded joints. Of course these joints would not be necessary if the power supply were housed in the drill collar section adjacent the MWD tool 35. A probe 67 is mounted within the MWD tool 35 along its axis and the lower end of the probe 67 fits into a socket 68 mounted on the upper end of the tail mass 51 of the acoustic receiver 14. The power supply is a battery pack system, but other systems such as a mud turbine could be used.

The socket 68 contains a pair of slip ring connectors 69 which co-operate with electrical contact pads (not shown) on the outer surface of the probe 67 and the probe 67 is locked inside the socket 68 by a releasable locking mechanism 70. The locking mechanism 70 and rings 69 allow relative rotational movement of the probe 67 and socket 68 during the assembly of the MWD tool 35 and due to torsional loads on the MWD tool 35. The probe 67 is attached to the inner member 41 by a vaned spider 71 and is linked to the electrical cable carrier 66 with the drill collar 37 by a threaded joint 72. A compliant telescopic section 73 of the probe 67 allows the length of the probe 67 to be varied over the same range as the MWD tool 35 and acts as an acoustic break to prevent the probe 67 forming an acoustic path from the receiver 14 to the rest of the drill string 11, whilst maintaining electrical continuity. The compliant telescopic section could of course be part of the socket 68 and vary its length instead of or as well as that of the probe 67.

The acoustic receiver 14 is able to act as an acoustic source as well as a receiver, as is described in GB 2288020. Data picked up by the acoustic receiver 14 acting as a receiver is pre-processed downhole by a processor (not shown) to reduce the data rate to a level commensurate with the capability of the data transmission link to the surface. The link may be a mud pulser, an electrical communications cable, an optical fibre or means using the wall of the drill string to carry acoustic signals.

In order to prevent the high pressure drilling mud escaping from the interior of the drill 65, annular seals are provided between all of the parts arranged for relative movement and, as is well known in the art, these seals can be pressure and volume compensated and protected from the abrasive effects of the drilling mud.

An acoustic source in the form of an airgun 16 is located at the earth's surface 17. In operation, the airgun 16 is controlled to transmit an acoustic pulse into the rock formations surrounding the borehole 12. The acoustic pulse propagates downwards through the rock formations at a velocity determined by the type of rock through which it is travelling. As the distance over which the acoustic pulse will travel may be quite large, the pulse is preferably a low frequency pulse in the region of 5–100 Hz. The acoustic energy travelling on a path 18 reaches the rock in contact with the drill bit 13, which thereby vibrates. The vibrations of the drill bit 13 are detected by the acoustic receiver 14 which is connected to it.

The acoustic energy travelling on a path 19 is reflected by a boundary 20 between two different types of rock. The boundary is below the level of the drill bit, that is to say the boundary is ahead of the drill bit 13. A proportion of the acoustic energy will be reflected by the boundary 20 on a path 21 to the drill bit 13. This will cause the drill bit 13 to vibrate, which again will be detected by the acoustic receiver 14. Acoustic energy travelling on a path 22 from the airgun 16 which is not reflected by the boundary 20 is incident on a second boundary 23. A proportion of this acoustic energy will be reflected on path 24 through the boundary 20 to the drill bit 13. This again will cause the drill bit 13 to vibrate, which will again be detected by the acoustic receiver 14. Data generated from the detected signals is transmitted to processing means (not shown) at the drilling rig 10 by well bore communication apparatus (not shown) or is processed by processing means (not shown) near the drill bit 13 and processed data is transmitted to the drilling rig 10.

The processing means (not shown) is operable to measure the propagation time and character of the acoustic pulse from the airgun 16 on the direct path 18 to the drill bit 13, the propagation time and character of the pulses travelling on the paths 19 and 21, when reflected by the boundary 20, and the propagation time and character of the acoustic pulses travelling on the paths 22 and 24, as is the case when reflected by the boundary 23. From the time measurement data and from the determined character of the received acoustic pulse, a number of pieces of useful information can be derived.

From the received data, the relationship between the acoustic travel time and the depth of the drill bit 13 can be determined. This may be considered as a form of calibration of seismic data obtained by prospecting either before drilling was commenced or during the early stages of drilling.

In addition to measuring transit times, apparatus according to the present invention can be used to perform more comprehensive acoustic prospecting operations, in particular by generating and subsequently analysing measurement data corresponding to characteristics such as the amplitude and/or frequency of the acoustic signals received between and after the primary received acoustic signals, which correspond to the paths 18, 19, 21, 22 and 24 described above. Data obtained in this way can provide valuable information regarding rock properties, how well-defined a boundary is, the inclination from the horizontal of a boundary and the like. This applies equally to the primary boundaries 20 and 23 and to less significant, unshown, boundaries.

Either or both of the above described measurement operations is preferably performed a number of times, with the drill bit 13 at a different position each time. This is achieved by transmitting a first acoustic pulse from the acoustic source 16 whilst the drill bit 13 is at a particular depth, then drilling for a certain distance, for example twenty metres, and then transmitting a second acoustic pulse from the acoustic source 16 and detecting again acoustic energy propagated through the rock formations and received by the acoustic receiver 14 via the drill bit 13 with the acoustic receiver 14. Alternatively or in addition, the measurement operation is performed with the source at a number of different positions or with a number of sources each at a different position. Collating data from a number of such measurements will result in similar information being obtained as would be obtained by a Vertical Seismic Profile (VSP) operation. However, this data can be obtained without having to remove the drill string and insert wireline geophones. This preferred aspect of the present invention allows the trajectory of the well to be determined during drilling so that adjustments can be made if the true trajectory departs from the required trajectory. Information regarding the structure and petrophysical properties of the rock formations surrounding the borehole is thus obtainable with minimum disruption to the drilling of the borehole 12.

Information obtained from apparatus in accordance with the present invention can be combined with information obtained from the drilling apparatus described in Patent Application GB 2288020 to provide more information about the nature of the rock formations further ahead of the drill bit 13 than can be deduced using the apparatus of that patent application alone.

Alternatively or in addition to having the airgun 16 mounted on the earth's surface, an airgun 25 could be mounted in a shallow borehole 26. Acoustic paths 27,28,29, 30 and 31, equivalent to the acoustic paths 18, 19,21,22 and 24, would then be used to carry the acoustic signals from the acoustic source 25 to the acoustic receiver 14 by way of the drill bit 13 and the rock formations about the borehole 12. For an offshore application, an acoustic source would be suspended in the water above the sea or lake bed.

Although a particular acoustic receiver has been described in the above embodiment, it will be appreciated by the person skilled in the art that any of a large number of workable acoustic receiver configurations would be suitable for this purpose. The scope of the present invention is limited only by the appended claims.

What I claim is:

1. Drilling apparatus for determining information about the rock formations about a borehole, comprising:

a drill bit connected at the end of a drill string in the borehole and in contact with rock at the end of the borehole;

an acoustic source located at or near the earth's surface; and an acoustic receiver in a mechanical connection with the drill bit such that acoustic signals transmitted by the acoustic source and propagated through the formations are received by the acoustic receiver via the drill bit; wherein the acoustic receiver is a piezo-ceramic transducer having one face in rigid connection with the drill bit; and a face of said acoustic receiver opposite the drill bit is connected to a tail mass.

2. Apparatus in accordance with claim 1 further comprising processing means for determining propagation time of acoustic signals from the acoustic source to the acoustic receiver.

3. Apparatus in accordance with claim 2 in which the processing means is operable to determine the propagation time or times of acoustic signals from the acoustic source to the acoustic receiver when reflected by a boundary or boundaries in the rock formations.

4. Apparatus in accordance with claim 1, in which the acoustic receiver is an accelerometer.

5. Apparatus in accordance with claim 1, in which the acoustic receiver is a geophone.

6. A method of obtaining information about the rock formations about a borehole, comprising:

(a) drilling the borehole with a drill bit connected to the end of a drill string;

(b) transmitting an acoustic signal from at or near the earth's surface;

(c) receiving the acoustic signal with an acoustic receiver in a rigid mechanical connection with the drill bit, the acoustic receiver comprising a piezo-ceramic transducer having one face in rigid connection with the drill bit and an opposite face connected to a tail mass, and the acoustic signal travelling through the rock formations and the drill bit to the acoustic receiver; and (d) recording measurement data obtained by the acoustic receiver.

7. A method in accordance with claim 6 further comprising:

(e) repeating steps (a) to (d) such that measurement data is recorded in respect of a different position of the drill bit.

8. A method in accordance with claims 6 in which the information about the rock formations comprises information constituting a seismic profile.

* * * * *